United States Patent [19]

Katz et al.

[11] 4,070,150
[45] Jan. 24, 1978

[54] CONTINUOUS MELTING DEVICE

[75] Inventors: Marvin Katz, Roeland Park; William J. Becicka, Overland Park, both of Kans.

[73] Assignee: Top-Scor Products, Inc., Kansas City, Kans.

[21] Appl. No.: 672,595

[22] Filed: Apr. 1, 1976

[51] Int. Cl.² .............................................. F27B 3/00
[52] U.S. Cl. ............................ 432/210; 126/343.5 R; 165/61
[58] Field of Search ................ 126/343.5 R, 343.5 A; 432/210; 165/61

[56] References Cited
U.S. PATENT DOCUMENTS

| | | | |
|---|---|---|---|
| 2,978,746 | 4/1961 | Rodenacker | 126/343.5 A |
| 3,010,147 | 11/1961 | Davies et al. | 126/343.5 A |
| 3,197,076 | 7/1965 | Chamblee | 126/343.5 A |
| 3,561,426 | 2/1971 | Wheeler | 126/343.5 A |
| 3,869,479 | 3/1975 | Barth et al. | 165/61 |
| 4,002,198 | 1/1977 | Wagner et al. | 165/61 |

Primary Examiner—John J. Camby
Attorney, Agent, or Firm—Fishburn, Gold & Litman

[57] ABSTRACT

Method and means are disclosed for converting substances from a solid state to a liquid state by melting. The invention is especially useful for liquifying organic substances, such as edible glycerides, that have a relatively low melting point and which must be guarded against degradation caused by overheating.

13 Claims, 6 Drawing Figures

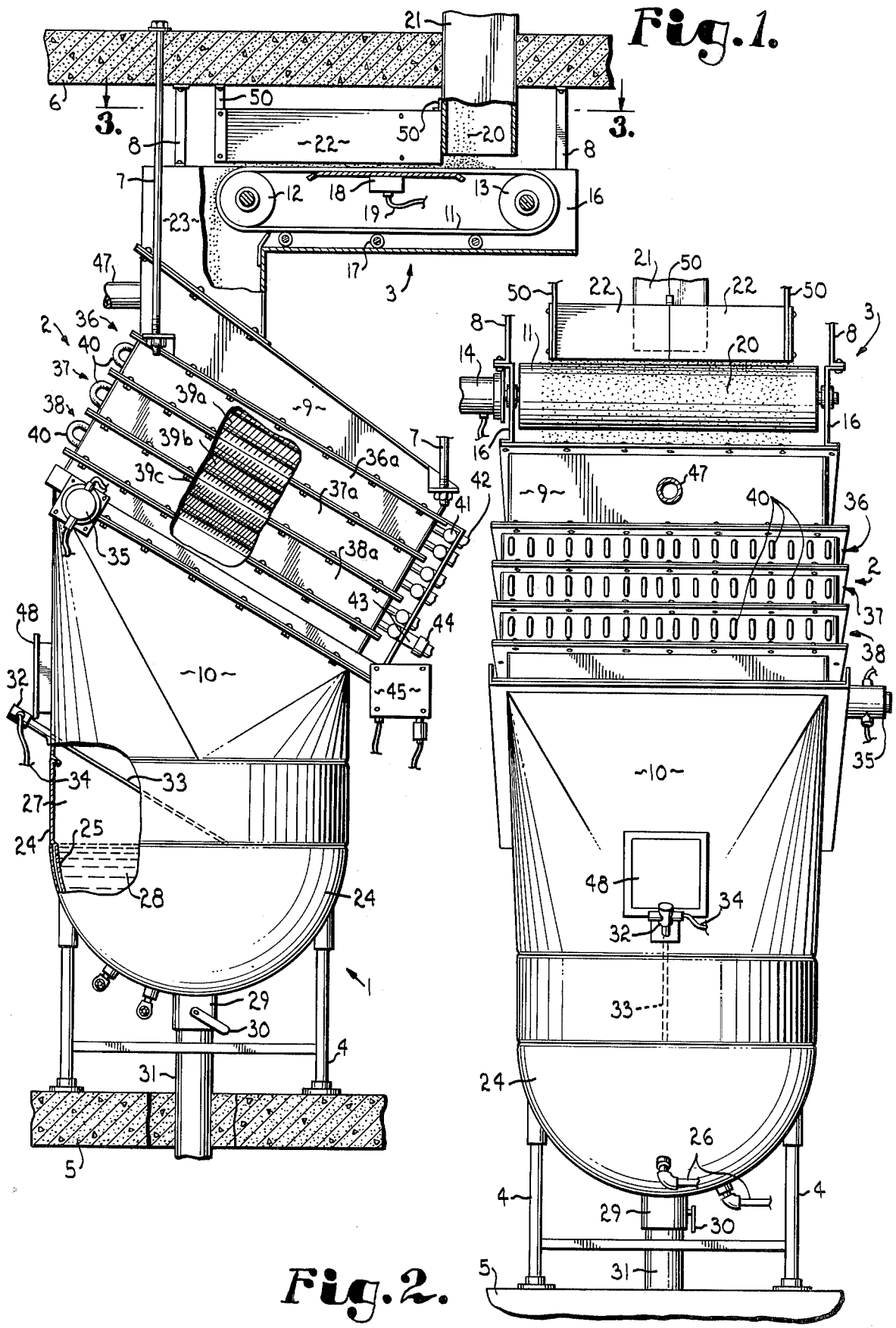

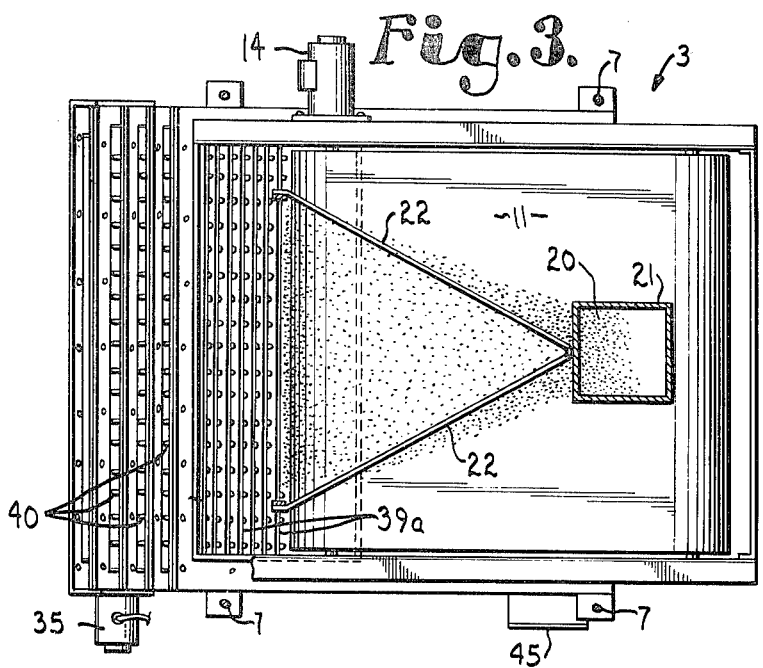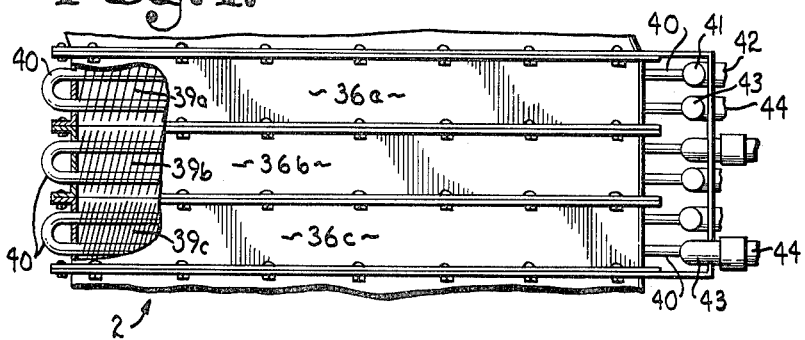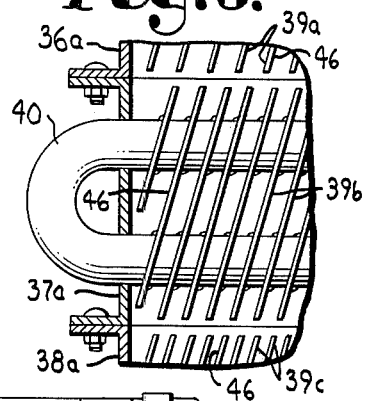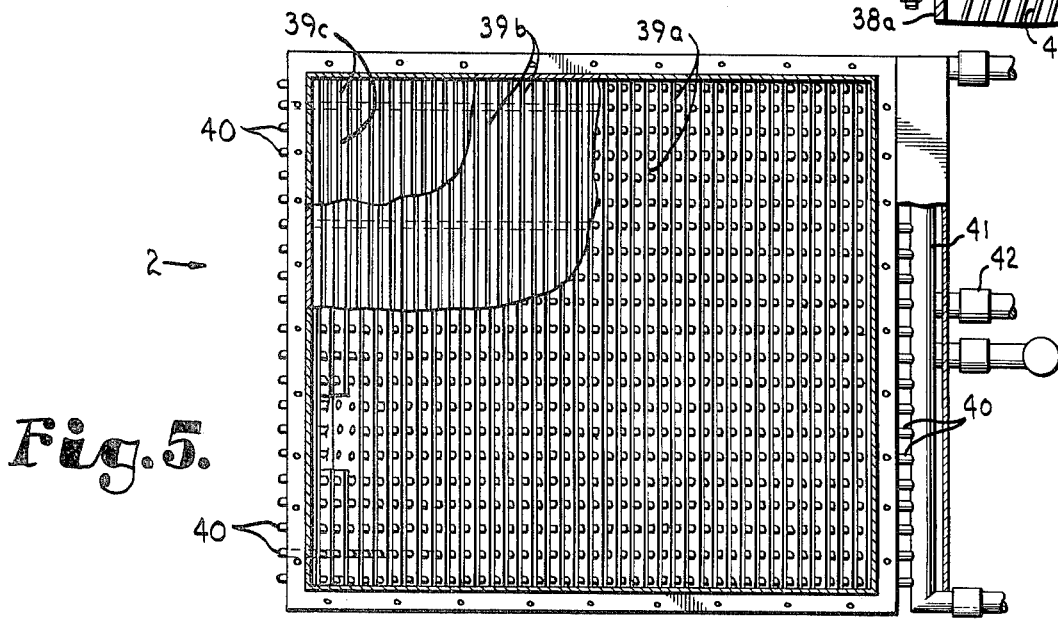

CONTINUOUS MELTING DEVICE

BACKGROUND OF THE INVENTION

The present invention pertains to the melting of substances for the purpose of converting them to the molten state. More particularly, the present invention pertains to apparatus and methods whereby a normally solid substance which is subject to degradation by heating can nonetheless be melted at a rapid rate without any significant scorching or burning thereof.

Edible fatty materials such as glycerides and esters of hydroxy acids with long chain alcohols are used, inter alia, as dough additives in the baking industry. For the purpose of blending such substances, and/or prior to the addition thereof to a dough mix, they must be melted for conversion from a normally solid state to a liquid state. In accordance with prior practices, such edible esters have been melted in steam jacketed kettles. This method has proven unsatisfactory for several reasons, including ineffeciency of the batch process, and the fact that many of such substances are highly heat sensitive, whereby the spot-overheating thereof in a kettle can cause discoloration, reduction of functionality, and alteration of desirable taste characteristics.

It is therefore an object of the present invention to provide for the melting of substances so as to avoid the aforementioned difficulties associated therewith.

Another object is to provide an improved apparatus for the melting of heat sensitive substances.

Still another object is to provide a method whereby heat sensitive substances can be melted continuously.

Yet another object is to provide for the melting of edible substances without the degradation thereof by burning or scorching.

Even another object is to provide for the rapid melting of glycerides and other edible esters while accomplishing the melting in conformity with the previously stated objects.

Other objects and advantages of the invention will become apparent from the following description and the appended claims.

SUMMARY OF THE INVENTION

The present invention makes use of a melter which comprises a melting means for liquifying solid particles of a substance, and a containing means for receiving and maintaining the substance in a liquid form after it has been melted. Accordingly, the melting means comprises a plurality of heatable plates that are spaced apart from each other in a side-by-side relationship, and which are oriented for impingement thereon of the substance to be melted during its transit to the containing means. A feeding means can be located ahead of the melting means in order to supply the substance thereto as a continuously flowing stream.

Solid particles of a substance to be melted can be directed onto the plates of the melting means while the plates are maintained at a suitable temperature which effects melting of the solid particles without overheating them. The substance melts by contact with the heated plate, then separates therefrom, and is recovered and maintained in a liquid state in the containing means. Melting can thus be conducted safely and continuously at a rapid rate.

BRIEF DESCRIPTION OF THE DRAWINGS

FIG. 1 is a side view, partly in section, of a melter constructed in accordance with the present invention.

FIG. 2 is an end view of the melter shown in FIG. 1.

FIG. 3 is a top view of the melter of FIGS. 1 and 2, looking downward from line 3—3 of FIG. 1.

FIG. 4 is a side view, partly in section, of the tube bundle of the melting means of the apparatus shown in FIGS. 1-3.

FIG. 5 is a top view of the tube bundle shown in FIG. 4.

FIG. 6 is a somewhat enlarged, partially sectional side view of the tubes and plates of the melting means shown in FIGS. 4 and 5.

DESCRIPTION OF PREFERRED AND ALTERNATIVE EMBODIMENTS

In FIG. 1, the melter comprises a kettle, a melting means, and a feeder which are generally represented at 1, 2 and 3, respectively. The kettle 1 is supported on legs 4 which rest on a floor 5, whereas the melting means 2 and feeder 3 are suspended from a ceiling 6 by means of suspension members 7 and 8, respectively. The feeder 3 discharges into an upper hood 9 which encloses a space between the feeder and the melting means 2, and the space through which a melted substance drips from the melting means to kettle 1 is enclosed by a lower hood 10.

As represented in the drawings, the feeder 3 is a weigh-belt type wherein an endless belt 11 turns on rollers 12 and 13. Roller 12 is a driven roller that is turned by means of a variable speed motor 14, whereas roller 13 is an undriven roller. The belt is enclosed on three sides by a bottom plate 15 and side plates 16. The lower part of the belt is prevented from dragging on bottom plate 15 by means of idler rollers 17. A transducer that is responsive to the weight of a substance being conveyed by the belt 11 is represented at 18. The lead 19 from the transducer is connected at its other end to a control unit, not shown, whereby the rate at which solid particles 20 to be melted is regulated and maintained at a preselected rate. Accordingly, the supplying of the solid particles 20 to the belt 11 is increased when the weight of the solid thereon is detected as being low by transducer 18, and is decreased when the weight is detected thereby as being high. The solid particles 20 are fed to the belt through an inlet chute 21 which leads from another feeder for bulk solids, not shown, that is responsive to transducer 18 and which is located below a supply bin, not shown, which contains a large quantity of the substance to be melted.

After the solid particles 20 have fallen onto the belt 11, they soon encounter a V-shaped dam 22 that is suspended above the belt by brackets 50 and which is maintained at a set spacing above the belt whereby many of the particles are forced toward the outside of the belt before they can pass under the dam, and the particles are thus caused to spread out over the width of the belt as shown in FIGS. 2 and 3. When the particles reach the end of the belt they fall as a wide, shallow stream into the outlet chute 23 of the feeder which leads into the upper hood 9 of the melting means 2.

Kettle 1 is provided with an outer wall 24 and an inner wall 25 which are spaced apart from each other to provide a jacket into which steam, hot water, or some other suitable heating fluid is introduced and removed through lines 26 for the purpose of heating the interior 27 of the kettle so that a molten substance 28 contained therein can be maintained in a liquid state. There is an outlet 29 which leads out of the interior of the kettle and a flow control valve 30 therein for regulating discharge of the melted substance from the kettle and into a supply line 31 which leads to any desired processing step having a need for the substance in a molten state.

Level detector 32 has a probe 33 which extends into the interior 27 of the kettle 1. When the melted substance 28 reaches a desired upper level in the kettle, such an occurance is sensed by the probe, and the detector 32 is thereby caused to transmit a signal to the feeder 3 through line 34 and control unit 35. Upon receiving the signal the feeder ceases the supplying of solid particles 20 to the melting means until the liquid level in the kettle falls to a desired lower level by discharge thereof through line 31. At that time, the detector 32 automatically signals the feeder 3 to again commence the supplying of solid particles to the melting means.

As shown in the drawings, the melting means 3 comprises upper, middle and lower heat exchanger tube bundles which are represented at 36, 37 and 38 respectively, and each of which is enclosed on four sides by a respective shroud represented at 36a, 37a and 38a. Each bundle comprises a plurality of hairpin tubes 40 which are spaced apart from each other, and which are parallel to each other, both horizontally and vertically. Each of the tube bundles also has a plurality of fins, hereinafter referred to as plates 39, which are spaced apart from each other in a side-by-side relationship along the lengths of the tubes 40. The plates 39a, 39b and 39c of each of the tube bundles 36, 37 and 39, respectively, are affixed to each tube 40 of each bundle and extend horizontally from one side of the bundle to the other.

A heating fluid such as steam or hot water is fed to the tubes 40 of each bundle through an inlet manifold 41 from a supply line 42, whereas steam or hot water is removed from the tubes 40 through a discharge manifold 43 and a return line 44. Each of the return lines 44 is provided with a thermal sensor and a valve whereby flow of the heating fluid through the tubes 40 of each bundle 36, 37, and 38 is regulated and maintained at a preselected temperature by means of a temperature by means of a temperature controller represented at 45.

Referring to FIG. 6, it can be seen that the plates of each tube bundle can be substantially parallel to each other, but that the side-to-side spacing of the plates need not be the same in each of the three bundles. More specifically, the spacing of the plates 39a in bundle 36 is greater than that of plates 39b in bundle 37, whereas the spacing of the plates 39c in bundle 38 is less than that in the other two bundles. It can also be seen from FIG. 6 that the plates are set at an acute angle with respect to the longitudinal extension of the tubes 40, so that the sides 46 of the plates are oriented transversally to the path taken by solid particles 20 during their approach toward the plates after being dropped from the belt 11 of feeder 3. In addition, the plates of an upper bundle 36 or 37 can overlie the plates of a lower bundle 37 or 38 to provide a tortuous path that must be followed during passage of solid particles 20 through the spaces between the plates of first one tube bundle and then another. As shown in FIGS. 1 and 3, this transverse and overlying orientation of the plates for impingement of the solid particles 20 on the sides thereof can be effected or made more pronounced by slanting the tube bundles at an acute angle to the horizon as shown.

It should be noted that each of the plates 39 is horizontally elongated and extends all the way across the bundle of tubes that pass through it, and that upper plates overlie lower plates, so that solid particles 20 of the substance to be melted cannot fall directly into the interior 27 of the kettle without first striking the sides 46 of the plates. Furthermore, the possibility of particles falling all the way through into the kettle without melting is greatly diminished by their having to pass through the ever narrowing spaces between the plates.

In operation, the controller 45 is set to supply heating fluid to tubes 40 of bundles 36, 37 and 38 and to maintain a temperature which will melt the solid particles 20 by contact with the plates 39, but which will not scorch or burn the substance being melted. Feeder 3 is set to deliver solid particles 20 of the substance at a rate whereby full melting thereof is achieved during passage to the kettle, but which is normally below a rate at which the substance will accumulate on the heated plates faster than it can be melted. Where preferred, a distributor means can be placed in the upper hood 9 to effect even distribution of the solid particles across the upper face of the tube bundle 36. In addition, a suction line 47 can lead from upper hood 9 for removal of solid particle fines which do not readily fall downward through the spaces between the heated plates. The upper hood 9 can also be equipped with a detector, not shown, which senses excessive build up of unmelted solid particles on the plates of tube bundle 36, and in which case the detector signals the feeder 3 to stop supplying solid particles until the detector no longer senses a build up of particles on the bundle.

The solid particles 20 that are fed to the melting means can be in the form of cubes, chunks, chips, powder, or the like, and such particulation of the substance can be effected by any suitable and convenient means. As the particles fall into the melting means, those of larger size lodge on the plates 39a of the uppermost tube bundle 36, whereas smaller particles sift through the spaces between the plates and eventually lodge on plates 39b and 39c. It should also be noted that as the larger particles soften and begin to melt, they can slide off the plates before they are fully melted, but only to be intercepted by underlying plates which are spaced closer together, so that they are again held in contact with the heated plates until substantially or completely melted. By use of tiers of tube bundles having plates spaced at increasingly smaller intervals, it is possible to achieve melting of all of the solid particles before they reach the interior 27 of kettle 1. The lower hood 10 can be provided with a window 48 whereby the substance dripping out of the melting means can be observed to determine whether or not the desired degree of melting is being obtained, and also to observe the level and condition of the molten substance 28.

As was previously indicated, the kettle 1 is heated with steam, hot water, or any other suitable heating fluid to maintain the molten substance 28 contained therein in a liquid state. The jacket temperature can be regulated and maintained by means of controller 45, or other suitable means, to supply only enough or slightly more heat than is needed to maintain the substance molten until it can be conveyed through line 31 to another process step, thereby avoiding overheating or degradation of the substance. It will also be appreciated that the body of molten substance 28 in the kettle amounts to a heat sink whereby any minor amounts of the substance not fully melted during passage through the tube bundles between completely melted upon blending with the molten substance in the kettle. The melting means 2 and kettle 1 should be sized to the expected demand of molten substance through line 31, and preferably are sized to provide a reasonable reserve capacity of the molten substance when the withdrawal rate thereof is momentarily faster than the rate at which the solid particles are being melted.

It can thus be seen that in accordance with the present invention solid particles of a meltable substance are directed onto heated plates that are spaced apart from each other in a side-by-side relationship, and whereafter the substance melts, separates from the plates and is then recovered in a molten state. To particular advantage, the plates are oriented at least substantially transversally with respect to the path followed by the solid particles as they approach the plates following transit from a feeder or other source of supply, since the particles can thus be directed onto the sides of the plates and thereby hindered for the purpose of transferring heat thereto so that the substance can be melted before it reaches the kettle.

To further advantage, the solid particles to be melted are heated by successive passage over heated plates arranged in two or more rows, and wherein plates of a first and a second row are spaced apart in side-by-side relationship, with plates of the first row being spaced further apart than plates of the second row. Accordingly, the solid particles to be melted are directed onto the sides of the plates in the first row, and the substance is thereafter directed onto the sides of the plates of the second and any other subsequent rows. As was previously indicated, more than two rows of plates can be used, and in which case the spacing of the plates in one row will be greater than that of the plates in a following row, whereby the spacing gradually diminishes as the substance being melted moves from one row of plates to another.

The present method and apparatus can be adapted to the melting of many substances by use of suitable materials of construction, construction techniques, heating fluids and the like, but it is especially suitable for the melting of organic substances having a melting point within the range of about 60° to about 250° F and which can be degraded by heating to temperatures significantly above the melting point for more than a short period of time. The present method and apparatus can thus be used to particular advantage for the heating of edible fatty acid esters such as monoglycerides, diglycerides, triglycerides, edible hydroxy acid esters such as stearyl lactylic ester, and mixtures of such edible esters.

In one suitable arrangement constructed substantially in accordance with the drawings, the tube bundles 36, 37 and 38 can have a thickness of 3 inches, the tubes thereof can be slanted at an angle of 45° to the horizontal, and the plates of the top, middle and lower bundles can be spaced apart from each other at distances of ⅜, ¼ and ⅛ inch, respectively. Since the plates are not perpendicular to the tubes on which they are mounted, they are inclined at an angle of less than 45°, e.g. 35°, when the tube bundles are slanted at a 45° angle, and the sides thereof are thus substantially horizontal and also substantially transversal to the path followed by solid particles 20 as they approach the plates from feeder 3.

In the broadest sense, the present invention does not require use of a feeder for the solid particles fed to the melting means, since the particles can merely be poured by hand when such is preferred, but there is advantage in using a screw feeder, belt feeder, vibrating feeder, or the like, which can be regulated for continuously maintaining a supply of the solid particles to the melting means at a selected rate. As was previously disclosed herein, a feeder shut-off means can be used for interrupting the supplying of solid particles by transmission of a signal to the feeder from a detector which determine that the liquid level of the melted substance in the kettle has reached a predetermined upper level and/or that the rate of supply of the solid particles exceeds the rate at which the substance is flowing through the melting means.

Also in the broadest sense, it is not essential that more than one row of plates be used in the melting means, since only one row of larger plates can be used instead. It is nonetheless preferred that more than one row of plates be used whereby some of the plates of the melting means overlie still other plates therein so that the path which must be followed by the solid particles through the melting means is a tortuous path, i.e. a path whereby a particle to be melted is caused to strike one or more of the plates in the melting means without being able to pass straight through to the kettle without striking any of the plates. More preferably, the path should be tortuous to the extent of causing a particle to be melted to strike at least one of the plates in each row thereof before the particle enters the kettle.

The plates can be arranged in rows located one ahead of another in order to improve the contacting thereof by the solid particles being melted, and although the particles to be melted can be suspended in a carrier gas and conveyed in a horizontal or even an upward direction across plates thus arranged, there is advantage in letting the substance fall through the melting system by gravity, as is represented in the drawings. Accordingly, the melting means can thus be located above the kettle and the heating plates can be spaced apart from each other horizontally and arranged in rows one above the other as shown.

Method and apparatus for achieving the previously stated objects have now been disclosed and described in detail, and even though the invention has been described with reference to particular apparatus, arrangements of apparatus, operating techniques, process conditions, substances which are melted, and the like, it will nonetheless be understood that even other embodiments will become apparent which are within the spirit and scope of the invention defined in the following claims.

What is claimed and desired to secure by Letters Patent is:

1. A melter which comprises a melting means for melting solid particles of a substance, a containing means for receiving said substance in molten form from said melting means, said melting means having a plurality of heatable plates that are spaced apart from each other in a side-by-side relationship with the sides of the plates oriented at least substantially transversely with respect to the path followed by said solid particles as they approach the plates, and wherein the sides of some of said plates overlie the sides of other of said plates, and the path followed through said melting means by said solid particles is a tortuous path.

2. Apparatus as in claim 1 and further comprising a feeding means located ahead of said melting means for supplying said substance thereto in the form of a flowing stream of solid particles.

3. Apparatus as in claim 1 wherein said plates are arranged in rows that are located one ahead of another with respect to the path followed by said substance through said melting means.

4. Apparatus as in claim 5 wherein the plates in one of said rows are spaced further from each other than are the plates of an adjacent row.

5. Apparatus as in claim 1 wherein said melting means is located above said containing means, said plates are spaced apart from each other horizontally and are arranged in rows, one of said rows being located above another row, and wherein the spacing of the plates in an upper row is greater than that of the plates in a lower row.

6. Apparatus as in claim 1 wherein at least some of said plates are substantially parallel to each other and are slanted at an acute angle to said path to be followed by said particles.

7. Apparatus as in claim 1 wherein said plates are attached to a tube through which a heating fluid can be circulated.

8. Apparatus as in claim 7 wherein said melting means comprises a tube bundle having a plurality of said tubes which are spaced apart from each other horizontally, and wherein said plates are attached to the tubes and are spaced apart from each other along the lengths thereof.

9. Apparatus as in claim 8 wherein said melting means comprises two of said tube bundles, one residing above the other, and wherein said spacing of the plates of the upper tube bundle is greater than that of the plates of the lower tube bundle.

10. Apparatus as in claim 1 wherein sid containing means is a kettle having a discharge outlet for removal therefrom of said substance in molten form, and further comprising means for supplying heat to the interior of said kettle.

11. Apparatus as in claim 10 and comprising a feeder for supplying solid particles of said substance to said melting means at a controlled rate, and further comprising a feeder shut-off means whereby the supplying of solid particles to said melting means is interrupted by transmission of a signal to the feeder from a detector which determines that the liquid in said kettle has reached a predetermined level.

12. Apparatus as in claim 4 and further comprising means whereby supplying of solid particles to said melting means is interrupted when the rate of supply thereof exceeds the rate at which said substance is flowing through said melting means.

13. Apparatus as in claim 1 and further comprising temperature control means whereby the temperature to which said plates are heated can be regulated and maintained at a selected temperature.

* * * * *